United States Patent
Nakamura

(10) Patent No.: US 9,390,485 B2
(45) Date of Patent: Jul. 12, 2016

(54) IMAGE PROCESSING DEVICE, IMAGE PROCESSING METHOD, AND RECORDING MEDIUM

(71) Applicant: Satoshi Nakamura, Kanagawa (JP)

(72) Inventor: Satoshi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/623,084

(22) Filed: Feb. 16, 2015

(65) Prior Publication Data

US 2015/0254523 A1 Sep. 10, 2015

(30) Foreign Application Priority Data

Mar. 7, 2014 (JP) .................................. 2014-044849
Jan. 21, 2015 (JP) .................................. 2015-009667

(51) Int. Cl.
*G06T 5/40* (2006.01)
*G06T 5/00* (2006.01)

(52) U.S. Cl.
CPC .. *G06T 5/40* (2013.01); *G06T 5/004* (2013.01)

(58) Field of Classification Search
None
See application file for complete search history.

(56) References Cited

U.S. PATENT DOCUMENTS

| | | | |
|---|---|---|---|
| 6,724,943 B2 | 4/2004 | Tsuchiya et al. | |
| 8,045,063 B2 | 10/2011 | Yokoyama et al. | |
| 8,564,863 B2 * | 10/2013 | Itoh | H04N 1/4095 358/538 |
| 8,625,892 B2 | 1/2014 | Nakamura | |
| 8,659,795 B2 | 2/2014 | Nakamura | |
| 8,659,801 B2 | 2/2014 | Nakamura | |
| 8,666,171 B2 | 3/2014 | Nakamura | |
| 8,681,379 B2 | 3/2014 | Nakamura | |
| 2009/0296998 A1 * | 12/2009 | Fox | A61B 6/5217 382/128 |
| 2010/0079385 A1 * | 4/2010 | Holmgren | G06F 3/0418 345/173 |
| 2012/0189208 A1 | 7/2012 | Inaba et al. | |
| 2013/0135635 A1 | 5/2013 | Nakamura | |
| 2013/0271798 A1 | 10/2013 | Nakamura | |

(Continued)

FOREIGN PATENT DOCUMENTS

| | | |
|---|---|---|
| JP | 3939428 | 7/2007 |
| JP | 4240324 | 3/2009 |

(Continued)

OTHER PUBLICATIONS

U.S. Appl. No. 14/533,157, filed Nov. 5, 2014.

(Continued)

Primary Examiner — Wesley Tucker
(74) Attorney, Agent, or Firm — Harness, Dickey & Pierce, P.L.C.

(57) ABSTRACT

An image processing device includes a first generating unit configured to generate smoothed image data including an edge portion by performing a smoothing process on original image data using an edge preserving smoothing filter; a second generating unit configured to generate first differential image data of a differential image between an image of the original image data and an image of the smoothed image data; a histogram generating unit configured to generate a differential histogram, which is a histogram of frequencies of difference values included in the first differential image data; a third generating unit configured to generate second differential image data by correcting the first differential image data using a correction amount, the correction amount for the first differential image data being calculated based on the differential histogram; and a synthesizing unit configured to synthesize the smoothed image data and the second differential image data.

8 Claims, 13 Drawing Sheets

(56) References Cited

U.S. PATENT DOCUMENTS

| | | |
|---|---|---|
| 2013/0272615 A1 | 10/2013 | Nakamura |
| 2014/0093162 A1 | 4/2014 | Nakamura |
| 2014/0126840 A1 | 5/2014 | Nakamura |
| 2014/0268065 A1 | 9/2014 | Ishikawa et al. |
| 2015/0002904 A1 | 1/2015 | Nakamura |
| 2015/0161773 A1* | 6/2015 | Takahashi ............ H04N 5/2171 382/173 |

FOREIGN PATENT DOCUMENTS

| | | |
|---|---|---|
| JP | 4415236 | 2/2010 |
| WO | WO2011033619 | 3/2011 |

OTHER PUBLICATIONS

U.S. Appl. No. 14/510,167, filed Oct. 9, 2014.

* cited by examiner

IMAGE PROCESSING DEVICE, IMAGE PROCESSING METHOD, AND RECORDING MEDIUM

BACKGROUND OF THE INVENTION

1. Field of the Invention

The present technology relates to an image processing device, an image processing method, and a recording medium.

2. Description of the Related Art

An image can be divided broadly into a flat potion, an edge potion and a texture portion. The flat portion is a region in the image having a small local luminance change while the edge portion is a region in the image having a large local luminance change. The texture portion is a region in the image having a luminance change in a relatively broad area, the luminance change not being so large as that of the edge portion.

A general impression of the image is determined according to the texture portion. When the texture portion included in a region in the image has a large luminance change, the image has a relatively rough impression, while when the texture portion included in a region in the image has a small luminance change, the image has a relatively smooth impression. Therefore, the general impression of the image can be controlled if the luminance change in the texture portion can be operated on.

A technology for improving sharpness of an image by emphasizing portions of the image other than the edge portion is known (for example, Japanese Patent Gazette No. 4415236). Specifically, in generating a differential image between an input image and a smoothed image which has been generated by performing an edge preserving smoothing process on the input image, the differential image is multiplied by a gain coefficient. Then, a consequent image, in which contrast or sharpness of the whole image is improved, is generated by adding the image multiplied by the gain coefficient to the smoothed image.

However, in the prior art described above, a user cannot easily operate an intensity of the texture portion as the user desired. That is, in the prior art described above, the method for dynamically determining the gain coefficient according to property of an input image is not disclosed, while the gain coefficient is set as a predetermined value for the whole image or set as values for respective pixels in the image, wherein the gain coefficient is to be determined according to an object of a correction, positions of the pixels, texture intensity or the like.

RELATED ART DOCUMENT

Patent Document

[Patent Document 1]: Japanese Patent Gazette No. 4415236

SUMMARY OF THE INVENTION

An object of the disclosure of the present technology is to provide an image processing device, an image processing method, and a recording medium capable of operating on intensity of a texture component of an image.

The following configuration is adopted to achieve the aforementioned object.

In one aspect of the embodiment, an image processing device includes: a first generating unit configured to generate smoothed image data including an edge portion by performing a smoothing process on original image data using an edge preserving smoothing filter; a second generating unit configured to generate first differential image data of a differential image between an image of the original image data and an image of the smoothed image data; a histogram generating unit configured to generate a differential histogram, which is a histogram of frequencies of difference values included in the first differential image data; a third generating unit configured to generate second differential image data by correcting the first differential image data using a correction amount, wherein the correction amount for the first differential image data is calculated based on the differential histogram; and a synthesizing unit configured to synthesize the smoothed image data and the second differential image data.

Other objects, features and advantages of the present invention will become more apparent from the following detailed description when read in conjunction with the accompanying drawings.

DETAILED DESCRIPTION OF THE PREFERRED EMBODIMENTS

Figure 1:
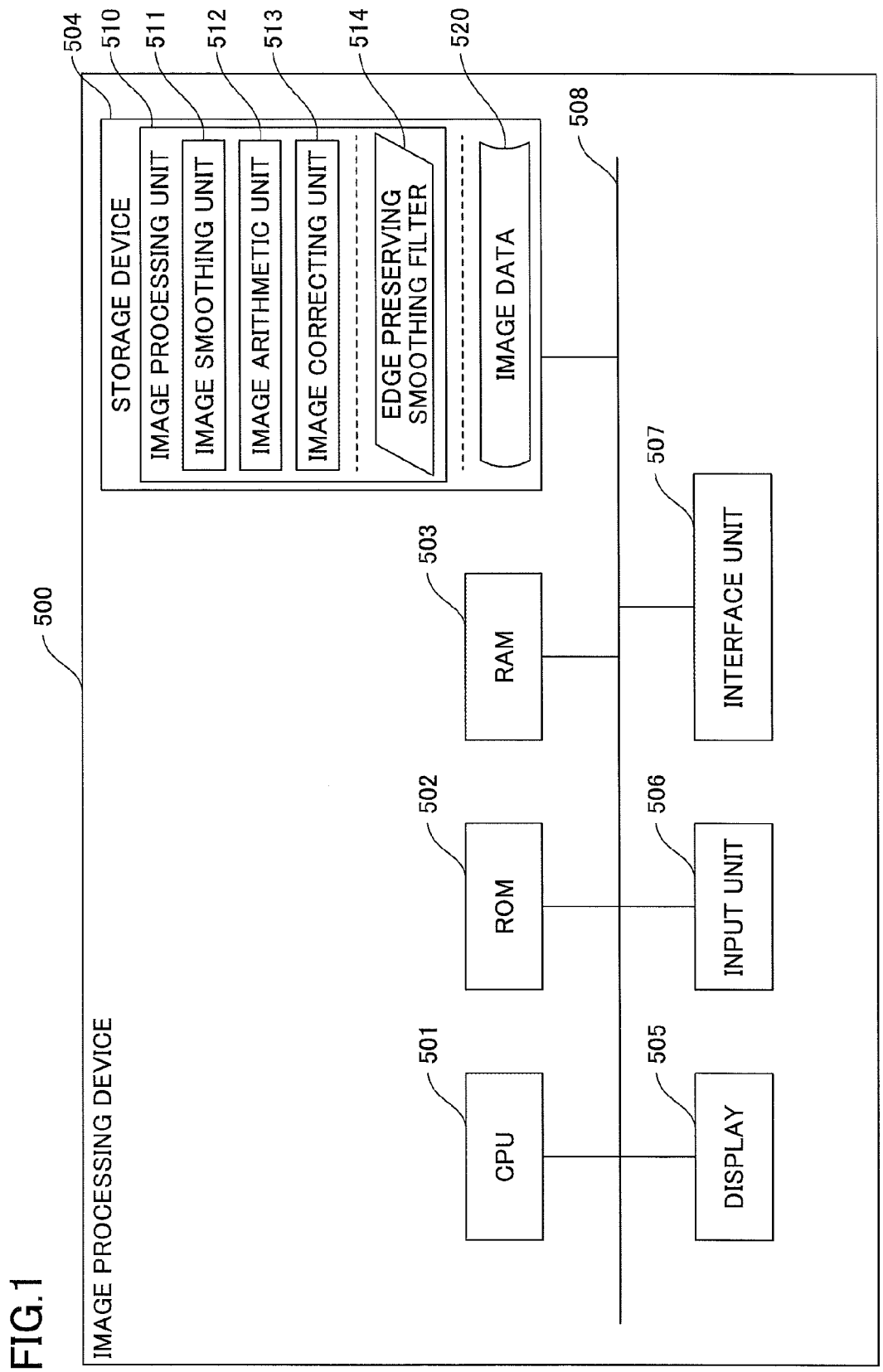
FIG. 1 is a block diagram illustrating an example configuration of an image processing device of the first embodiment.

Herein below, embodiments will be described with reference to accompanying drawings. Additionally, in the present specification and drawings, an identical reference numeral will be applied to elements or the like that have identical functions and configurations, and descriptions thereof will be omitted.

(First Embodiment)

<Configuration of Image Processing Device>

In the following, an example configuration of an image processing device capable of performing image processing of the present embodiment will be described. FIG. 1 is a block diagram illustrating an example configuration of an image processing device of the first embodiment.

As described in FIG. 1, the image processing device 500 includes a CPU (Central Processing Unit) 501, a ROM (Read Only Memory) 502, a RAM (Random Access Memory) 503 and a storage device 504. Further, the image processing device 500 includes a display 505, an input unit 506 and an interface unit 507. Additionally, parts in the image processing device 500 are connected with each other through a bus 508.

The CPU 501 is a processor for executing a program stored in the storage device 504.

The ROM 502 is a nonvolatile memory. The ROM 502 stores programs, data and the like for enabling the CPU 501 to execute the program stored in the storage device 504. Specifically, the ROM 502 stores boot programs and the like, such as BIOS (Basic Input/Output System), EFI (Extensible Firmware Interface), etc.

The RAM 503 is a main storage device such as DRAM (Dynamic Random Access Memory), SRAM (Static Random Access Memory), or the like. The RAM 503 serves as a work memory onto which the program stored in the storage device 504 is loaded when the program is executed by the CPU 501.

The storage device 504 stores programs, which serve as an image processing unit 510, and image data 520. Additionally, the programs which serve as the image processing unit 510 include a program which serves as an image smoothing unit 511, a program which serves as an image arithmetic unit 512 and a program which serves as an image correcting unit 513. Further, the programs, which serve as the image processing unit 510, include an edge preserving smoothing filter 514 used by the image smoothing unit 511 when performing smoothing process.

In the image processing device 500, the programs, which serve as the image processing unit 510, are executed by the CPU 501, thereby performing image processing described below on image data (original image data) 520.

Performing an edge preserving smoothing process on the image data 520, thereby generating smoothed image data including an edge portion.

Subtracting the smoothed image data from the image data 520, thereby extracting the differential image data in which only texture component is included.

Generating a histogram based on the differential image data, thereby calculating correction amount applying to the differential image data, based on the histogram.

Correcting the differential image data based on the calculated correction amount, thereby generating a corrected differential image data.

Synthesizing the smoothed image data and the corrected differential image data thereby generating a composite image data.

The display 505 shows images of the image data 520 not processed by the image processing unit 510 and images of image data 520 processed by the image processing unit 510 (composite image data). Also, the display 505 shows a setting screen for setting parameters of the edge preserving filter 514 when the image smoothing unit 511 performs the smoothing process.

The input unit 506 is an operating member for operating (sending instructions for execution of the image process to the image processing unit 510, setting operations of parameters) the image processing device 500, including the mouse, the keyboard, and the like.

The interface unit 507 connects external devices, thereby receiving image data to be processed by the image processing unit 510, or sending processed image data to the external devices.

<Functional Configuration of Image Processing Unit in Image Processing Device>

Figure 2:
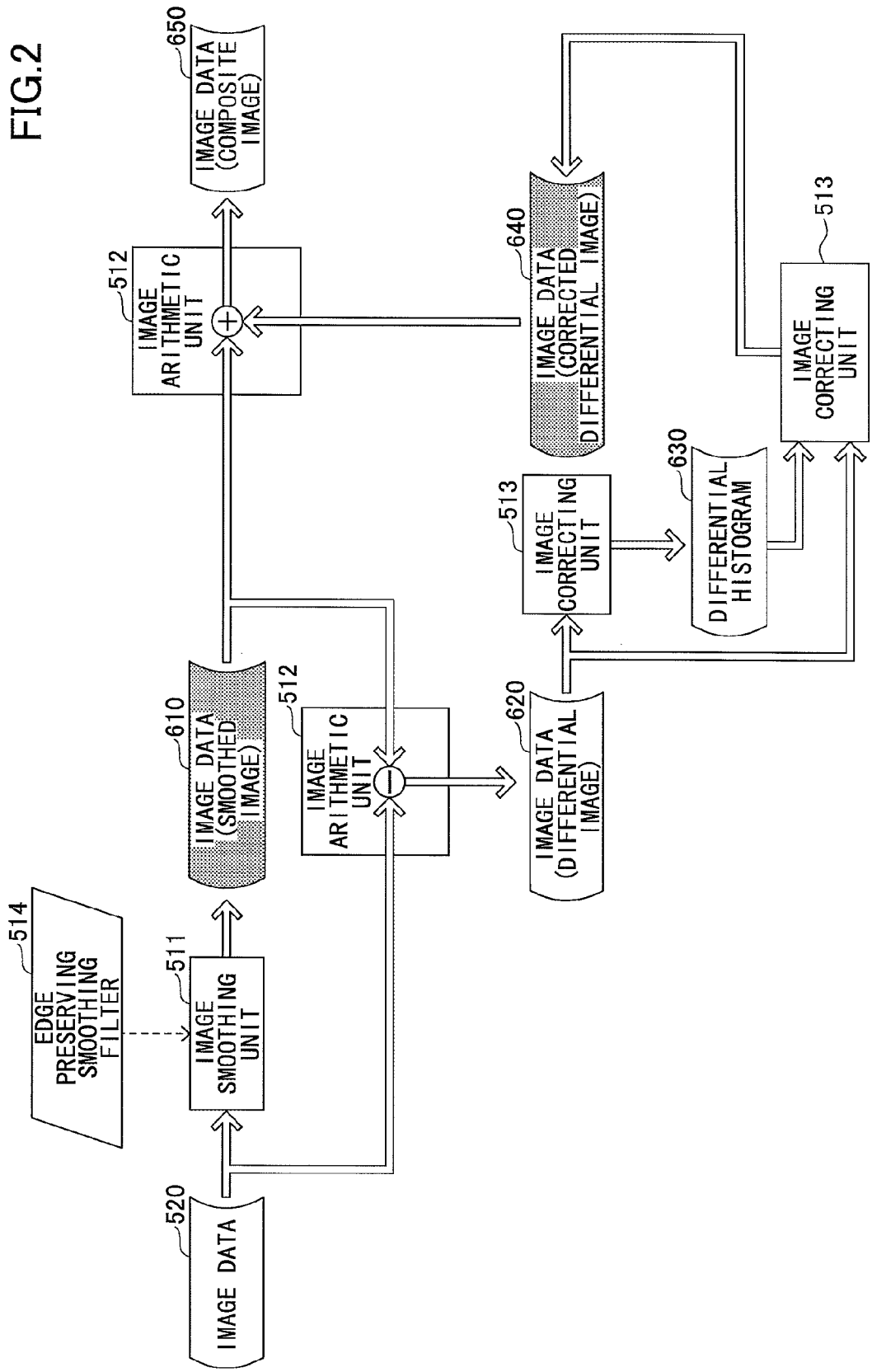
FIG. 2 is a block diagram illustrating a functional configuration of an image processing unit of the image processing device.

In the following, a functional configuration of the image processing unit 510 of the image processing device 500 will be described. FIG. 2 is a block diagram illustrating the functional configuration of the image processing unit 510 of the image processing device 500. First, as shown in FIG. 2, the image data (original image data) 520 is received by the image smoothing unit 511.

The image smoothing unit 511, receiving the image data 520, performs the smoothing process on the image data 520, using the edge preserving smooth filter 514, thereby generating image data (smoothed image data) 610.

The edge preserving smoothing filter 514 can smooth image keeping portions thereof where luminance change is sharp, such as edge portions. Generally, in a case where a normal smoothing filter is used instead of the edge preserving smoothing filter, the edge portion will be lost. A process for restoring the edge portion is not required in a case where the edge preserving smoothing filter is used, while the process is required in such a case where the normal smoothing filter is used. Further, in a case where the differential image created by using the normal smoothing filter is processed to be emphasized, bright or dark fringes called halo may occur in the vicinity of the edge, while the occurrence of the halo can be prevented by using the edge preserving smoothing filter.

Thus, the generated image data 610 includes an abstract image component and the edge portion. The generated image data 610, together with the image data 520, is received by the image arithmetic unit 512.

The image arithmetic unit 512, receiving the image data 520 and the image data 610, calculates difference values between the image data 520 and the image data 610, thereby generating image data (differential image data) 620 that is of a differential image. That is, the image data 620 is composed of the texture component which is a detailed image component included in the image data 520, while the edge portion is not included in the image data 620. The generated image data 620 is received by the image correcting unit 513.

The image correcting unit 513, receiving the image data 620, generates a differential histogram 630, which is a histogram of respective values of pixels of the image data 620 (difference values between the image data 520 and the image data 610). The generated differential histogram 630 and the image data 620 are received by the image correcting unit 513.

The image correcting unit 513, receiving the differential histogram 630 and the image data 620, determines a correction amount for the image data 620 based on the differential histogram 630, then corrects the image data 620 using the correction amount, thereby generating image data (corrected image data) 640. The image data 610 and the image data 640 are received by the image arithmetic unit 512. The correction amount is determined by adjusting a shape, a representative value, or statistics of the differential histogram 630 so as to serve a certain purpose.

The image arithmetic unit 512, receiving the image data 610 and the image data 640, synthesizes the image data 610 and the image data 640, thereby generating image data (composite image data) 650 that is of a composite image. In the image data 650, the texture portion of the image data 520 is corrected. That is, a user can generate the image data 650, in which the texture portion of the original image data 520 is corrected, by determining the correction amount based on the differential histogram 630, then synthesizing the image data (corrected differential image data) 640 corrected by the correction amount and the image data (original image data) 520.

<Flow of Image Processing>

Figure 3:
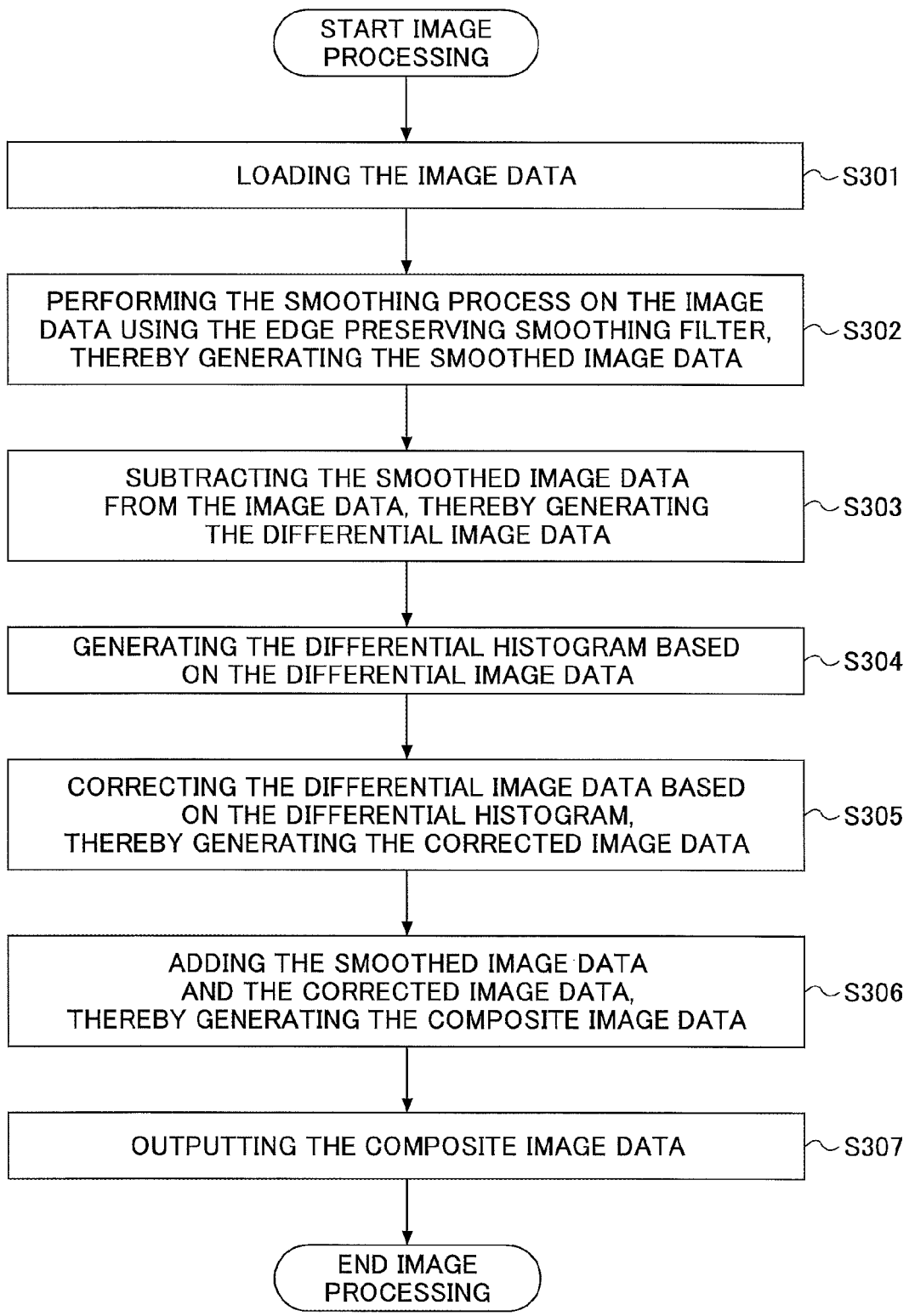
FIG. 3 is a flowchart illustrating image processing of the image processing device of the first embodiment.

In the following, a flow of image processing performed by the image processing device 500 will be described. FIG. 3 is a flowchart illustrating image processing of the image processing device of the first embodiment. The process shown in FIG. 3 is started by an instruction from a user.

In step S301, the image data (original image data) 520 stored in the storage device 504 is loaded. Additionally, for example, the image data 520 stored in the storage device 504 is stored by retrieving the data from a storage medium, such as a CD, a DVD or a HDD, or from network storage. Or, the image data 520 stored in the storage device 504 may be stored by receiving the data loaded by an image loading unit (not shown) through the interface unit 507.

In step S302, the image smoothing unit 511 performs the smoothing process on the loaded image data 520 using the edge preserving smoothing filter 514, thereby generating the image data (smoothed image data) 610. Additionally, at this time, the display 505 shows the setting screen for setting parameters of the edge preserving filter 514, and the image smoothing unit 511 performs the smoothing process with the set parameters.

A median filter, a bilateral filter, a joint bilateral filter, a guided filter, an ϵ (epsilon) filter, etc., are exemplified as the edge preserving smoothing filter 514.

Additionally, the joint bilateral filter may be referred to as a cross bilateral filter.

In step S303, the image arithmetic unit 512 calculates the difference values between the image data 520 and the image data 610 (i.e. subtracting the image data 610 from the image data 520), thereby generating the image data (differential image data) 620 in which only the texture component is included. Additionally, the image data 620 may be generated with signed values or with separated values and signs.

In step S304, the image correcting unit 513 generates the differential histogram 630 based on the image data (differential image data) 620. The differential histogram 630 is generated by recording number of appearances of each difference value (pixel value) in the image data 620 or appearance frequency thereof. Additionally, bins (classes) of the histogram 630 may correspond to the difference values. Or bins of the histogram 630 may be correspond to respective grouped difference values (for example, a bin corresponds to the difference values within a certain range), thereby reducing the number of the bins. Further, the differential histogram 630 may be generated using every pixel in the image data 620, or may be generated sampling the image data 620 with a certain interval.

In step S305, the image correcting unit 513 determines a correction amount for correcting the image data (differential image data) 620 based on the differential histogram 630, and corrects the image data 620 using the correction amount, thereby generating the image data (corrected image data) 640. Additionally, the correction amount is determined based on a predetermined target value. For example, the target value is set for statistics, such as average, variance, kurtosis or skewness, of the histogram 630; contrast, such as maximum value, minimum value or width, of the histogram 630; representative value, such as average value, center value or most frequent value, of the histogram 630; or the like. The correction amount can be calculated as a difference or ratio between such target value and a value in the histogram 630 corresponding to the target value. For example, the correction amount is calculated so that the most frequent value in the histogram 630 becomes equal to the target value. Additionally, correction amount may not be calculated as one value as described above. The correction amount may be a group of values where the value range of the differential histogram 630 is divided into a plurality of portions and thereby calculating the values of the correction amount, as described above, in the respective portions.

In step S306, the image arithmetic unit 512 synthesizes the image data 610 and the image data 640 (that is, adding the image data 610 and the image data 640), thereby generating the image data (composite image data) 650 that is of a composite image. In step S307, the image data 650 is output.

Additionally, in above described step S304, although the differential histogram 630 is generated directly using the difference values, absolute values of the difference values may be used to generate the differential histogram 630. Further, in a case where, as described, using the absolute figures of the difference values (that is, in a case where the histogram is generated based on only positive values of the bins), in step S303, the image data 620 may be generated based on absolute values of the difference values between the image data 520 and the image data 610.

However, in a case where, as described, using the absolute values of the difference values, signs of the difference values have to be separately stored, and any one of the following processing has to be performed.

(a) in step S305, the signs are respectively applied to corresponding pixels, when the image data 620 is corrected.
(b) in step S306, signs are respectively applied to corresponding pixels when synthesizing the image data (smoothed image data) 610 and the image data (corrected image data) 640.

<Summary>

As described above, in the image processing device of the present embodiment, image data (differential image data) corresponding to the texture component is generated based on the difference values between image data (original image data) and image data generated by performing the smoothing process using the edge preserving smoothing filter on the image data. Then, image data, in which the intensity of the texture component is controlled so as to meet the target property, can be generated by correcting values of statistics, representative values, etc., of the differential histogram, which is generated based on the differential image data, so as to become equivalent to predetermined values. That is, for example, when correcting so as to de-emphasize the differential image data, smoothness of the texture portion in the processed image (composite image data) will be increased. However, when correcting so as to emphasize the differential image data, roughness of the texture potion in the processed image will be increased.

[Second Embodiment]

In the following, an image processing device of the second embodiment will be described. In the present embodiment, correction amount is determined based of a differential histogram given in advance (reference histogram).

<Functional Configuration of Image Processing Unit in Image Processing Device>

Figure 4:
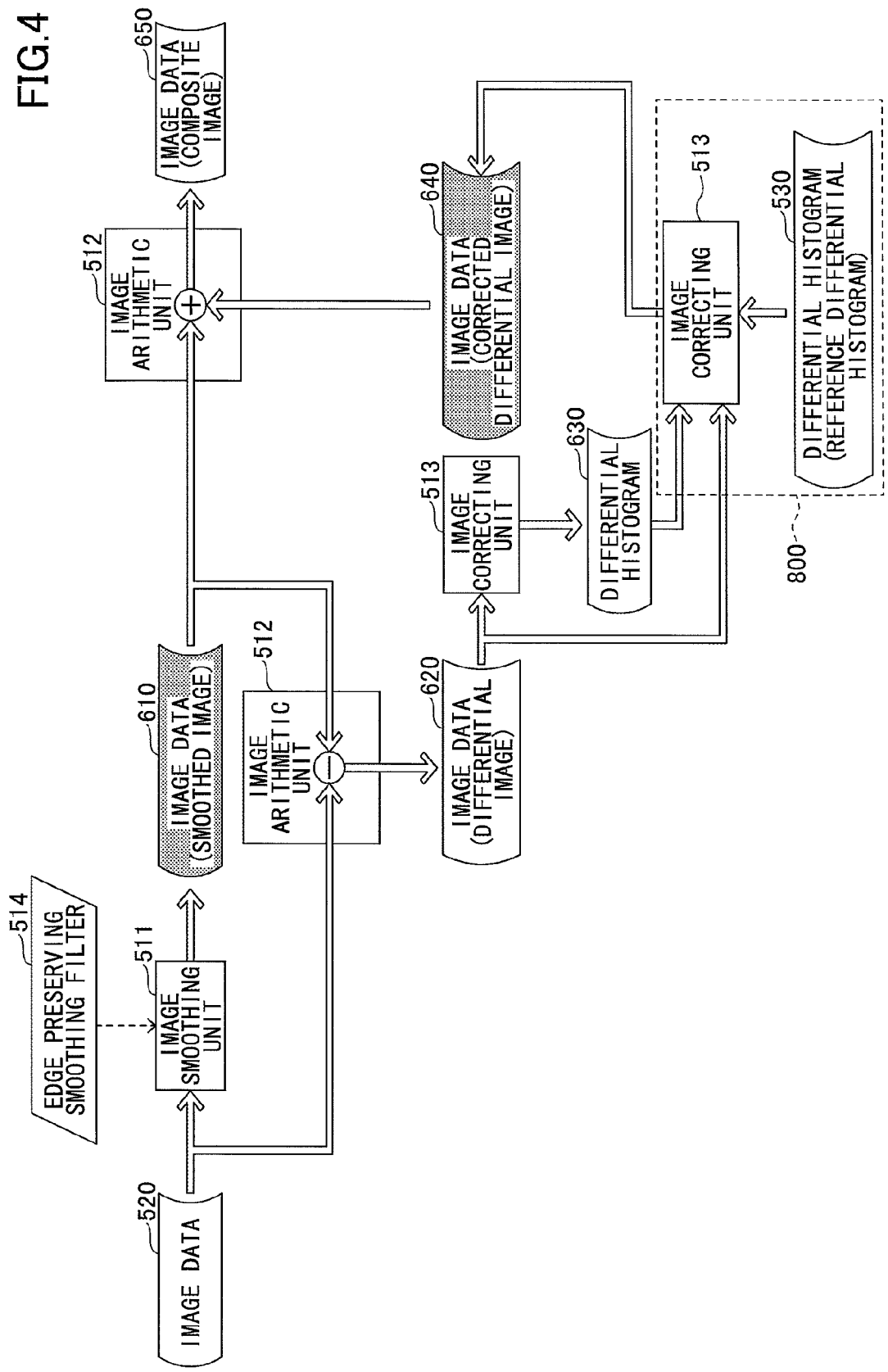
FIG. 4 is a block diagram illustrating a functional configuration of the image processing unit of the image processing device of the second embodiment.

First, a functional configuration of the image processing unit 510 of the image processing device 500 will be described. FIG. 4 is a block diagram illustrating the functional configuration of the image processing unit of the image processing device of the second embodiment. Additionally, the difference of the functional configurations of the image processing unit 510 of the image processing device 500 between the present embodiment and the first embodiment (FIG. 2) is a process surrounded by dotted line 800.

Specifically, the image correcting unit 513 determines the correction amount based on the differential histogram 630 and a differential histogram (reference differential histogram) 530 which is given by the user in advance, then corrects the image data (differential image data) 620 using the determined correction amount, thereby generating the image data (corrected differential image data) 640. In this case, the image correcting unit 513 determines the correction amount so that the differential histogram 630 becomes equivalent (or closer) to the differential histogram 530.

Additionally, for example, the user may obtain the differential histogram (reference differential histogram) 530 by loading the differential histogram from a storage medium such as a CD, a DVD, etc., through the interface unit 507, or by receiving the differential histogram through a network.

<Flow of Image Processing>

Figure 5:
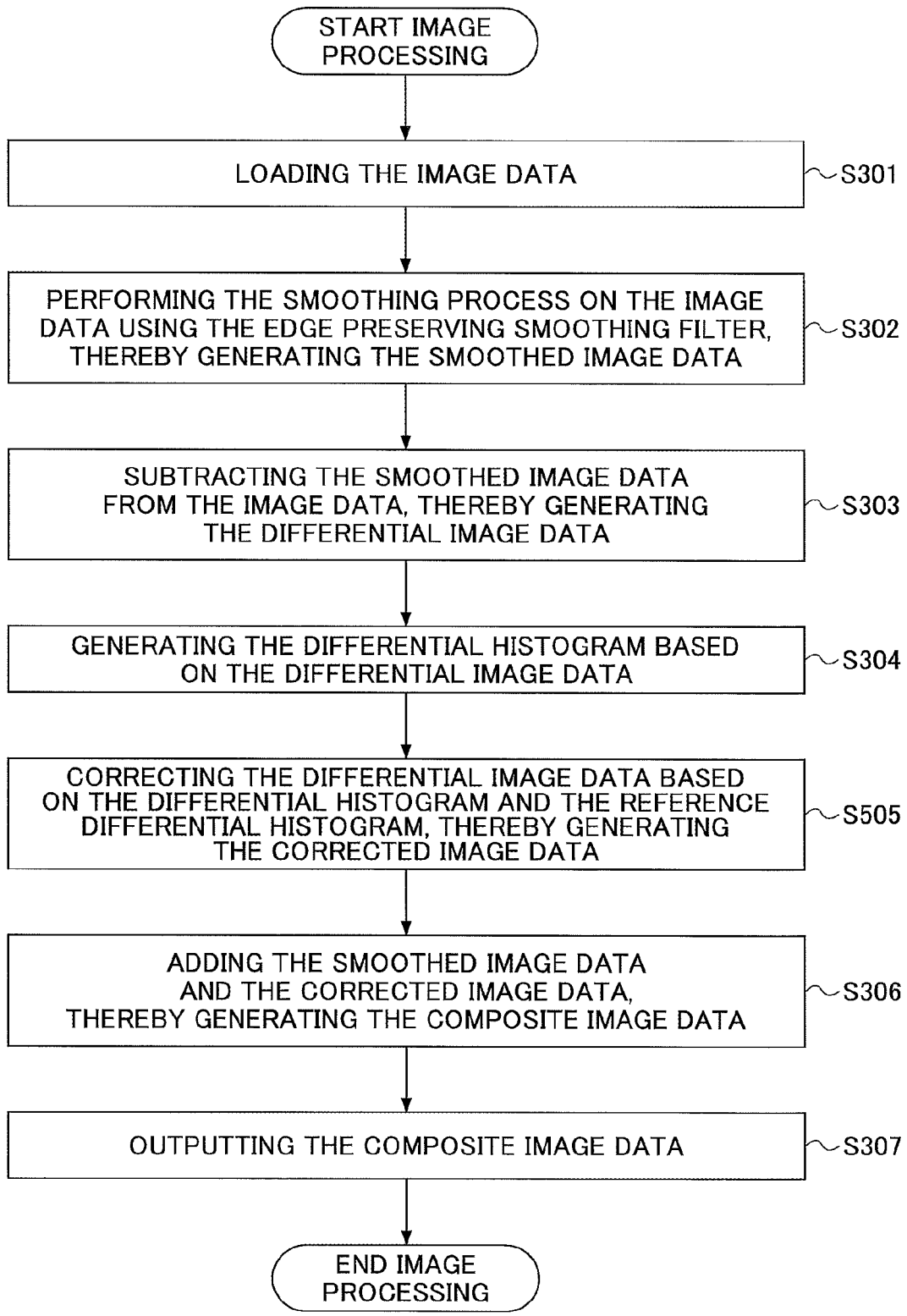
FIG. 5 is a flowchart illustrating the image processing of the image processing device of the second embodiment.

In the following, a flow of the image processing of the present embodiment performed by the image processing device 500 will be described. FIG. 5 is a flowchart illustrating the image processing of the image processing device of the second embodiment. Additionally, the difference of the image processing performed by the image processing device 500 between the present embodiment and the first embodiment (FIG. 3) is step S505. Therefore, in the following step S505 is described.

In step S505, the image correcting unit 513 determines the correction amount for correcting the image data (differential image data) 620 based on the differential histogram 630 and the differential histogram (reference differential histogram) 530, then corrects the image data 620 using the correction amount, thereby generating the image data (corrected image data) 640. The image correcting unit 513 determines the correction amount so that the differential histogram 630 becomes equivalent (or closer) to the differential histogram 530. Here, methods for determining the correction amount are exemplified as follows.

(a) Correcting by Statistics

In this case, statistics of the difference values are calculated from the differential histogram 630, then gain or offset is given to the image data (differential image data) 620 so that the calculated statistics become equivalent to those of the differential histogram 530. Average, variance, etc., are exemplified as the statistics. Further, the gain can be calculated as a ratio of standard deviations which can be found as square roots of the variance, while the offset can be calculated by multiplying a difference between averages by the gain.

When a value before correcting is shown as "$v_1$", a value after correcting is shown as "$v_2$", the gain is shown as "$g$", and the offset is shown as "$b$", a correcting process is expressed by the formula shown below.

$$v_2 = g \cdot v_1 + b$$

Here, the gain "$g$" and the offset "$b$" are respectively expressed by the formulas shown below, wherein average and variance of the differential histogram 630 are respectively shown as "$\mu_{in}$" and "$\sigma_{in}^2$" while average and variance of the differential histogram 530 are respectively shown as "$\mu_{ref}$" and "$\sigma_{ref}^2$".

$$g = \sqrt{\frac{\sigma_{ref}^2}{\sigma_{in}^2}} = \frac{\sigma_{ref}}{\sigma_{in}}$$

$$b = \mu_{ref} - g \cdot \mu_{in}$$

(b) Correcting Contrast of the Histogram

In this case, gain or offset is given to the image data (differential image data) 620 so that the area of the differential histogram 630 becomes equivalent to that of the differential histogram 530. The correcting process is expressed similarly to (a) described above. The gain "$g$" and the offset "$b$" are respectively expressed by the formulas shown below, in which a maximum value and a minimum value of the differential histogram 630 are respectively shown as "$\min_{in}$" and "$\max_{in}$" while a maximum value and a minimum value of the differential histogram 530 are respectively shown as "$\min_{ref}$" and "$\max_{ref}$".

$$g = \frac{\max_{ref} - \min_{ref}}{\max_{in} - \min_{in}}$$

$$b = \min_{ref} - g \cdot \min_{in}$$

Additionally, the maximum value and the minimum value may be set as values at respective ends of a value range of the differential histogram, or may be found by eliminating data in a certain degree of the value range in the respective ends of the value range of the differential histogram. By eliminating data in a certain degree in both ends of the value range of the differential histogram, the effect from so called outliers can be reduced. By the same reason, a histogram created based on a mixed distributions model may be used instead of the differential histogram, where the mixed distributions model is created by modeling the differential histogram with a model such as a mixed distributions model, or the like.

<Summary>

As described above, the image processing device of the present embodiment can control intensity of the texture component, without setting a specific correction amount in advance, by using the differential histogram (reference histogram) 530 as the target for determining the correction amount.

[Third Embodiment]

In the following, an image processing device of the third embodiment will be described. In the present embodiment, the correction amount is determined using a cumulative frequency histogram. That is, the correction amount is determined based on a cumulative frequency histogram 631 and a cumulative frequency histogram (reference cumulative frequency histogram) 531 instead of the differential histogram 630 and the reference differential histogram 530 of the second embodiment.

Additionally, the cumulative frequency histogram (reference cumulative frequency histogram) 531 may be given in advance, or may be generated based on the differential histogram (reference differential histogram) 530 given in advance. Herein below, description will be given where the cumulative frequency histogram (reference cumulative frequency histogram) 531 is given in advance.

<Functional Configuration of Image Processing Unit in Image Processing Device>

Figure 6:
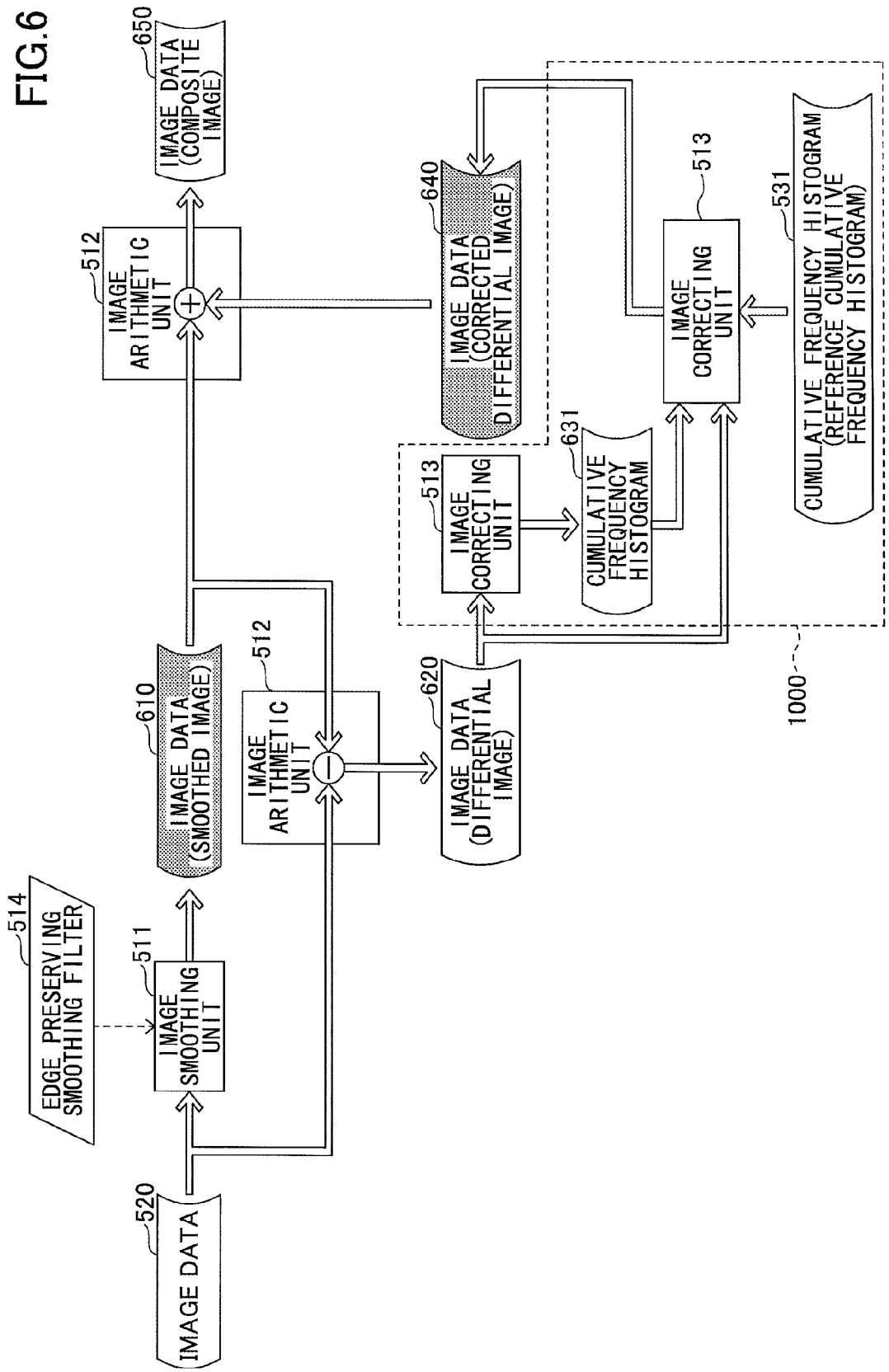
FIG. 6 is a block diagram illustrating a functional configuration of the image processing unit of the image processing device of the third embodiment.

First, a functional configuration of the image processing unit 510 of the image processing device 500 of the present embodiment will be described. FIG. 6 is a block diagram illustrating the functional configuration of the image processing unit of the image processing device of the third embodiment. Additionally, the difference of the functional configurations of the image processing unit 510 of the image processing device 500 between the present embodiment and the first embodiment (FIG. 2) is a process surrounded by dotted line 1000.

Specifically, the image correcting unit 513 generates the cumulative frequency histogram 531 based on the image data (differential image data) 620. Also, the image correcting unit 513 determines the correction amount based on the cumulative frequency histogram 631 and the cumulative frequency histogram (reference cumulative frequency histogram) 531 which is given in advance, then corrects the image data 620 using the determined correction amount, thereby generating the image data 640. In this case, the image correcting unit 513 determines the correction amount so that the cumulative frequency histogram 631 becomes equivalent (or closer) to the cumulative frequency histogram 513.

<Flow of Image Processing>

Figure 7:
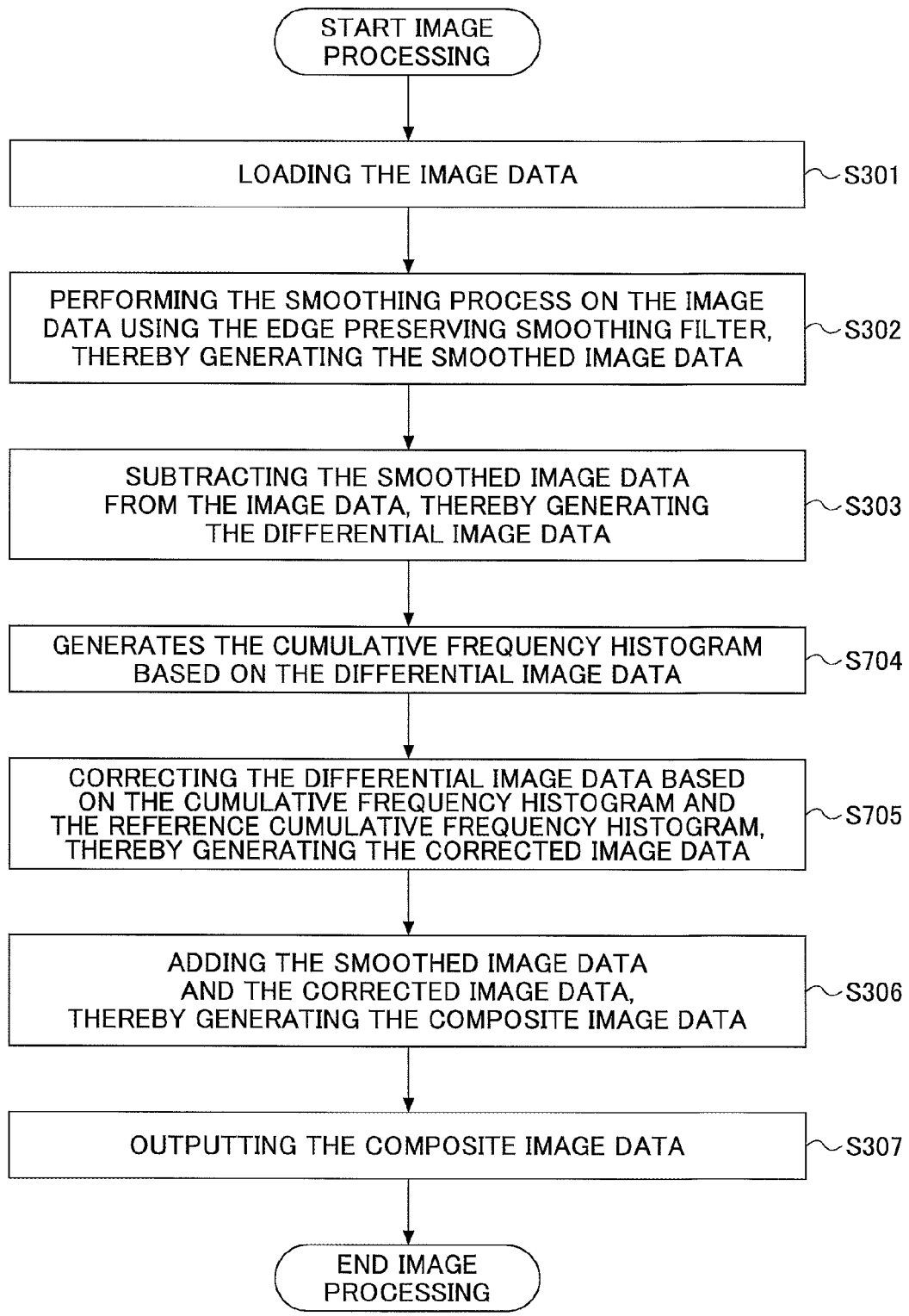
FIG. 7 is a flowchart illustrating the image processing of the image processing device of the third embodiment.

In the following, a flow of the image processing of the present embodiment performed by the image processing device 500 will be described. FIG. 7 is a flowchart illustrating the image processing of the image processing device of the third embodiment. Additionally, the difference of the image processing performed by the image processing device 500 between the present embodiment and the first embodiment (FIG. 3) is steps S704 and S705. Therefore, in the following steps S704 and S705 are described.

In step S704, the image correcting unit 513 generates the cumulative frequency histogram 631 based on the image data 620. The cumulative frequency histogram 631 is generated by recording all the bins up to a certain bin in the differential histogram 630 and normalizing it. Additionally, for example, the cumulative frequency histogram 631 can be generated by performing the following process.

(1) Generating the Differential Histogram 630

With reference to pixel values of the image data 620, votes are given to corresponding bins of the differential histogram 630. This operation is repeatedly performed on every pixel of the image data 620. Additionally, the votes may be given with reference to pixel values included in a certain area extracted by performing a sampling process on the image data 620 with a certain interval, instead of every pixel of the image data 620. In this case, the differential histogram 630 can be generated faster.

(2) Generating Cumulative Differential Histogram Based on the Differential Histogram 630

This process is executed by setting cumulative values for the $N_{th}$ bin in the cumulative differential histogram, where each of the cumulative values is a cumulated value from a head bin of the differential histogram 630 to the $N_{th}$ bin.

(3) Normalizing the Cumulative Differential Histogram

Respective values of the bins in the cumulative deference histogram are divided by a value of the last bin so that every value of the bins becomes within a range from 0 to 1. Thus, the cumulative frequency histogram 631 is generated.

In step S705, the image correcting unit 513 determines the correction amount based on the cumulative frequency histogram 631 and the cumulative frequency histogram (reference cumulative frequency histogram) 531, then corrects the image data 620 using the correction amount, thereby generating the image data (corrected image data) 640. The image correcting unit 513 determines the correction amount so that the cumulative frequency histogram 631 becomes equivalent (or closer) to the cumulative frequency histogram 531. Here, methods for determining the correction amount are exemplified as follows.

(a) Histogram Matching

In this case, the pixel values of the image data 620 are adjusted (corrected) so that a shape of the cumulative frequency histogram 631 becomes equivalent to that of the cumulative frequency histogram (reference cumulative frequency histogram) 531. For example, the pixel values can be adjusted by using a lookup table for converting pixel values, which lookup table may be designed so that the cumulative frequency of the cumulative frequency histogram 631 becomes equivalent to that of the cumulative frequency histogram 531.

Figure 8A:
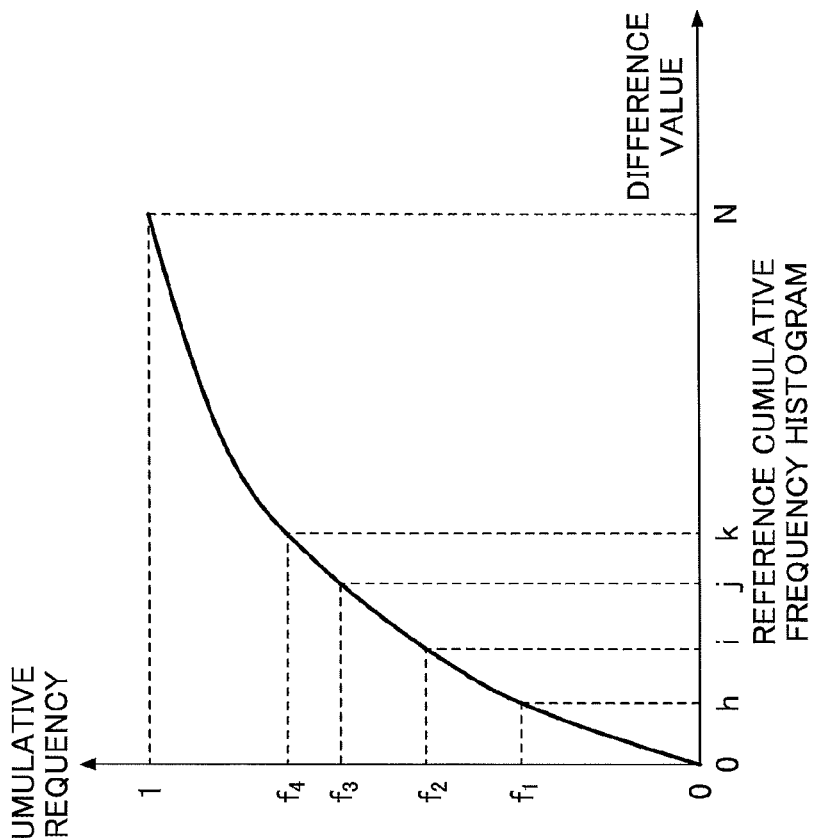
FIG. 8A is an example of an input cumulative frequency histogram.
Figure 8B:
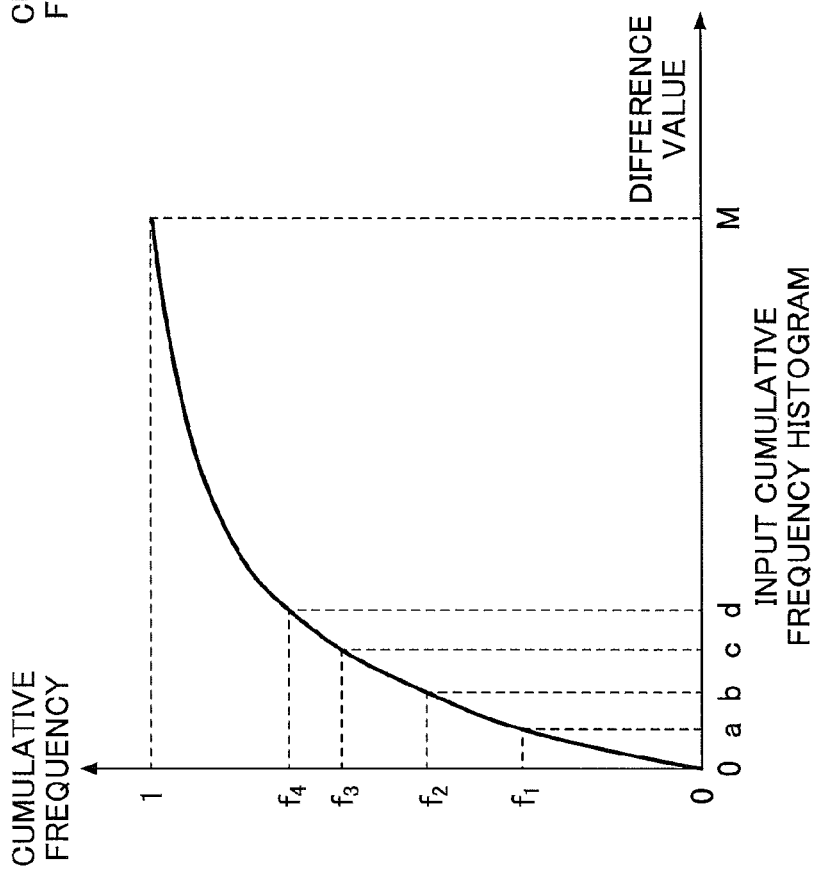
FIG. 8B is an example of a reference cumulative frequency histogram.

A specific description of a process for generating such a lookup table is given with reference to FIG. 8A and FIG. 8B. FIG. 8A shows an example of cumulative frequency histogram 631. FIG. 8B shows an example of the cumulative frequency histogram (reference cumulative frequency histogram) 531.

The lookup table described above can be generated by following process.

(1) Finding a cumulative frequency $f_1$ corresponding to a value "a" in the cumulative frequency histogram 631 shown in FIG. 8A.

(2) Finding a value "h" of which the cumulative frequency is $f_1$ in the cumulative frequency histogram 531.

(3) Recording the values founded in (1) and (2) respectively being associated with each other, i.e. recording a combination of (a,h).

(4) Repeating to perform (1)-(3) over the whole value range of the cumulative frequency histogram 631, i.e. recording combinations of (b,i), (c,j), (d,k), . . .

(5) Creating a table with the values found in (1)-(4), thereby creating the lookup table.

After creating the lookup table, a correcting process is performed by converting the respective values in the image data 620 into corresponding values in the lookup table. Additionally, in a case where there is a lost part of the lookup table with respect to the value range of the cumulative frequency histogram 631, the part may be inserted internally or externally by using values in the vicinity of the lost part, if needed. Further, fluctuation may be reduced by performing a moving average process on the created lookup table.

Additionally, although the cumulative frequency histograms shown in FIG. 8A and FIG. 8B are example histograms using absolute values of the difference values, the lookup table can be similarly created even in a case where the cumulative frequency histograms are generated without using absolute values of the difference values.

(b) Area Under the Curve

In this case, the correction amount is determined by representing a shape of the cumulative frequency histogram with an area under the curve to operate on (correct) the image data (differential image data) 620. The area under the curve (AUC) means an area surrounded by a curve, a coordinate axis, and a perpendicular line from the curve to the coordinate axis. An area under the curve $AUC_{in}$ of the cumulative frequency histogram 631 and an area under the curve $AUC_{ref}$ of the cumulative frequency histogram 531 are respectively calculated to determine the correction amount that is the ratio of the AUCs (AUC ratio). Additionally, the AUCs may be calculated using the whole value range of the respective cumulative frequency histograms or using a limited value range thereof. However, since the calculation result using the whole value range may not reflect the differences only existed in some parts of value range, preferably, the value range is limited to an appropriate extent if needed.

Methods for correction using the AUC ratio are exemplified as follows.

Multiplying pixel values of the image data (differential image data) 620 by a gain that is the AUC ratio.

Recording the difference values in the cumulative frequency histogram 631 being associated with the difference values in the cumulative frequency histogram 531, where the cumulative frequency of the difference value in the cumulative frequency histogram 631 is equal to the cumulative frequency of the associated difference value in the cumulative frequency histogram 531 multiplied by the AUC ratio; then creating the lookup table with a process similar to (a), thereby converting the image data 620 using the created lookup table. For example, in a case where the AUC ratio is "ρ" and the cumulative frequency of a difference value "a" in the cumulative frequency histogram 631 is "$f_1$", the lookup table is created by recording the difference value "a" being associated with a difference value "α" whose cumulative frequency is "$\rho f_1$" in the cumulative frequency histogram 531. By using above mentioned tow methods of non-linear transformation, the intensity can be controlled with higher flexibility than using linear transformation. Specifically, for example, the texture portion is almost similarly emphasized or deemphasized in whole range of the intensity when using the linear transformation described in the second embodiment, such as correcting by statistics or correcting contrast, while the texture portion can be emphasized or deemphasized in respective ranges of the intensity, further the degree of emphasizing or deemphasizing can be controlled when using the two methods described in the present embodiment.

<Summary>

As described above, the image processing device of the present embodiment can control intensity of the texture component without setting a specific correction amount in advance, by using the cumulative frequency histogram (reference cumulative frequency histogram) 531 as the target for determining the correction amount. Especially, a ratio of unevenness (ratio of variance of luminance) in the texture portion can be precisely corrected to be a target ratio using the correction amount determined through the histogram matching. That is, an intensity of the texture potion in the original image can be precisely corrected to become equivalent to the target intensity.

[Fourth Embodiment]

In the following, an image processing device of the fourth embodiment will be described. In the present embodiment, image data (reference image data) 540 for being target of texture component is given in advance. Then, the cumulative frequency histogram of the given image data (reference image data) 540 is generated similarly to that of the image data (original image data) 520, thereby determining the correction amount based on the cumulative frequency histograms.

<Functional Configuration of Image Processing Unit in Image Processing Device>

Figure 9:
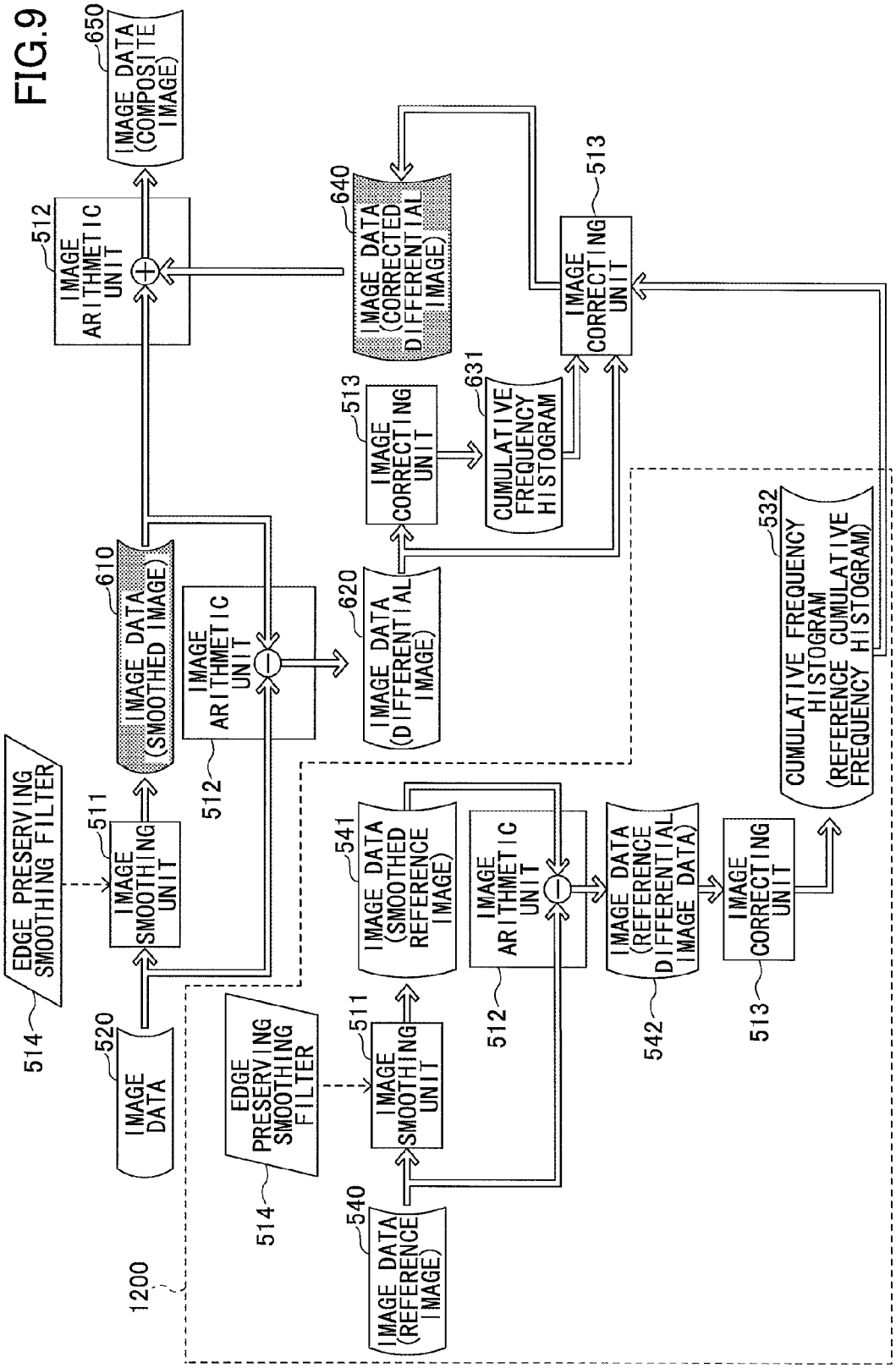
FIG. 9 is a block diagram illustrating a functional configuration of the image processing unit of the image processing device of the fourth embodiment.

First, a functional configuration of the image processing unit 510 of the image processing device 500 of the present embodiment will be described. FIG. 9 is a block diagram illustrating the functional configuration of the image processing unit of the image processing device of the fourth embodiment. Additionally, the difference of the functional configurations of the image processing unit 510 of the image processing device 500 between the present embodiment and the third embodiment (FIG. 6) is a process surrounded by dotted line 1200.

Specifically, the image smoothing unit 511, receiving the image data 540 (reference image data) given by the user, performs the smoothing process on the image data 540, using the edge preserving smoothing filter 514, thereby generating image data (smoothed reference image data) 541. The generated image data 541 is received by the image arithmetic unit 512.

The image arithmetic unit 512, receiving the image data 540 and the image data 541, calculates a difference value between the image data 540 and the image data 541, thereby generating image data (reference differential image data) 542 that is data of a differential image. The generated image data 542 is received by the image correcting unit 513.

Further, the image correcting unit 513, receiving the image data 542, generates a cumulative frequency histogram (reference cumulative frequency histogram) 532 based on the values of respective pixels of the image data 542 (respective difference values between the image data 540 and the image data 541). The generated cumulative frequency histogram 532 is received by the image correcting unit 513. Then, the image correcting unit 513 determines the correction amount based on the cumulative frequency histogram 631 and the generated cumulative frequency histogram 532 so that the cumulative frequency histogram 631 becomes equivalent (or closer) to the cumulative frequency histogram 532.

<Flow of Image Processing>

Figure 10:
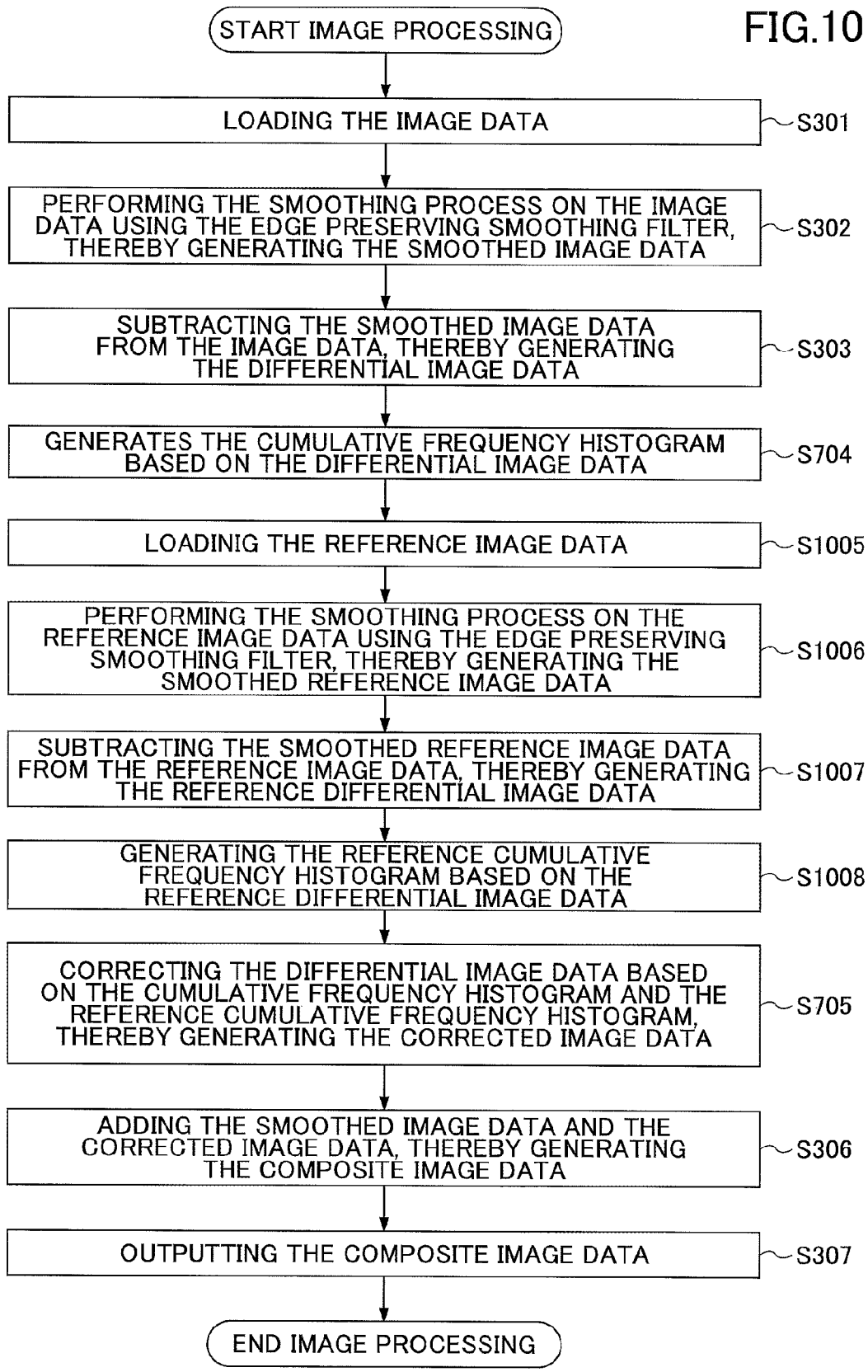
FIG. 10 is a flowchart illustrating the image processing of the image processing device of the fourth embodiment.

In the following, a flow of the image processing of the present embodiment performed by the image processing device 500 will be described. FIG. 10 is a flowchart illustrating the image processing of the image processing device of the fourth embodiment. Additionally, the difference of the image processing performed by the image processing device 500 between the present embodiment and the third embodiment (FIG. 7) is steps S1005-S1008.

Therefore, in the following, steps S1005-S1008 are described. The steps S1005-S1008 are respectively almost identical to the steps S301-S303 and S704, therefore description thereof is simplified.

In step S1005, the image data (reference image data) 540 is loaded. Additionally, for example, the image data (reference image data) 540 may be stored in the storage device 504 or may be loaded from a storage medium, such as a CD, a DVD or a HDD, or from network storage, through the interface unit 507. Or, the image data 540 may be stored by receiving the data loaded by an image loading unit (not shown) through the interface unit 507.

In step S1006, the image smoothing unit 511 performs the smoothing process on the loaded image data 540 using the edge preserving smoothing filter 514, thereby generating the image data (smoothed reference image data) 541.

In step S1007, the image arithmetic unit 512 calculates the difference values between the image data 540 and the image data 541, thereby generating the image data (reference differential image data) 542 in which only a texture component is included.

In step S1008, the image correcting unit 513 generates the cumulative frequency histogram (reference cumulative frequency histogram) 532 based on the image data 542.

<Summary>

As described above, the image processing device of the present embodiment uses the image data (reference image data) 540 as a target for determining the correction amount. That is, intensity of the texture component can be abstractly given using the reference image (image data 540), when the intensity of the texture component of the image data (original image data) 520 is corrected to a certain intensity. Therefore, the user may only specify a target image (reference image). That is, the user can correct the texture portion to that having target intensity by an intuitive operation, without specifying parameters or specific value of the histograms.

[Fifth Embodiment]

In the following, an image processing device of a fifth embodiment will be described. In the present embodiment, color spaces of the image data (original image data) 520 and the image data (reference image data) 540 are converted into a different color space from an original color space. Further, the color space of the image data (composite image data) 650 is converted into the original color space. That is, in the present embodiment, a color space (e.g. HSV color space) of the image data (differential image data) 620 being corrected is different from the original color space (e.g. RGB color space).

<Configuration of Image Processing Device>

Figure 11:
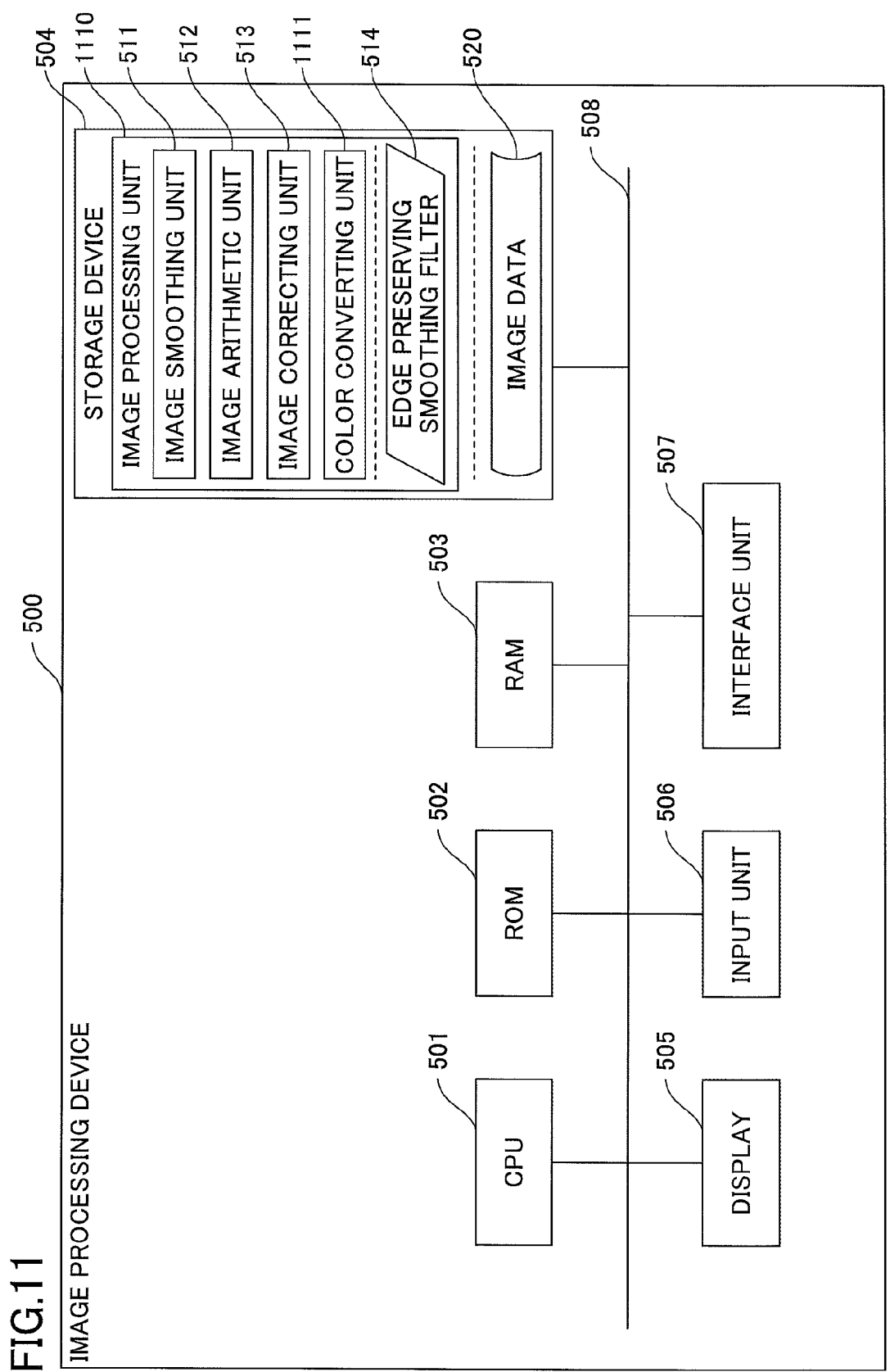
FIG. 11 is a block diagram illustrating an example configuration of the image processing device of the fifth embodiment.

In the following, an example configuration of an image processing device capable of performing image processing of the present embodiment will be described. FIG. 11 is a block diagram illustrating an example configuration of an image processing device of the fifth embodiment. Additionally, the difference from the image processing device 500 shown in FIG. 1 is that a program, which serves as a color converting unit 1111, is included in an image processing unit 1110 stored in the storage device 504.

The color converting unit 1111 performs a color space converting process on the image data.

<Functional Configuration of Image Processing Unit in Image Processing Device>

Figure 12:
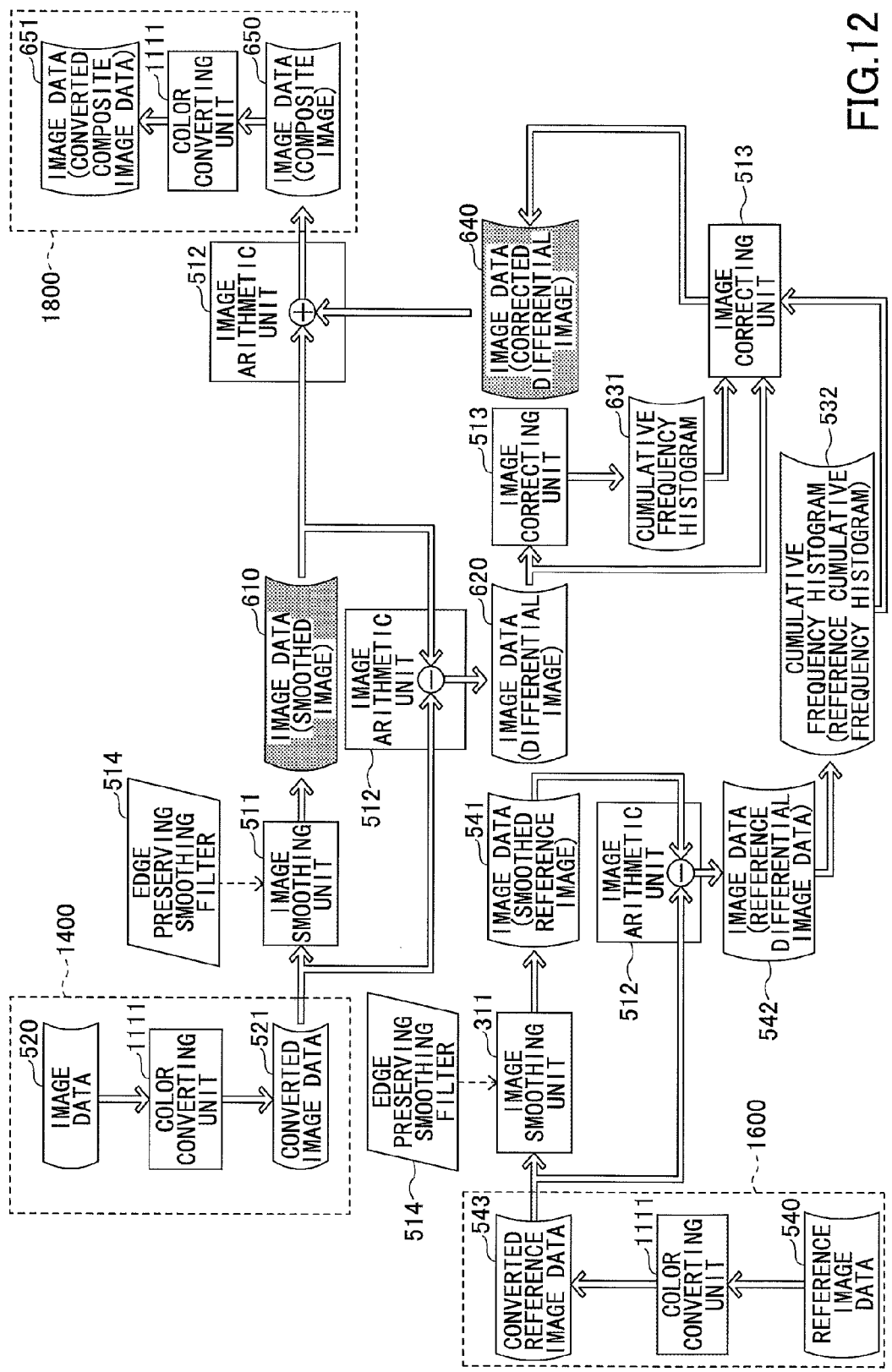
FIG. 12 is a block diagram illustrating a functional configuration of the image processing unit of the image processing device of the fifth embodiment.

In the following, a functional configuration of the image processing unit 1110 of the image processing device 500 of the present embodiment will be described. FIG. 12 is a block diagram illustrating the functional configuration of the image processing unit of the image processing device of the fifth embodiment. Additionally, the difference of the functional configurations of the image processing units of the image processing devices 500 between the present embodiment and the fourth embodiment (FIG. 10) is a process surrounded by dotted lines 1400, 1600 and 1800.

Specifically, the color converting unit 1111, receiving the image data 520, converts a color space of the image data, thereby generating image data (converted image data) 521 having a converted color space. The image data 521 is received by the image smoothing unit 511.

Similarly, the color converting unit 1111, receiving the image data (reference image data) 540, converts a color space of the image data 540, thereby generating image data (converted reference image data) 543 having the converted color space. The image data 543 is received by the image smoothing unit 511.

Further, the color converting unit 1111, receiving the image data (composite image data) 650, converts a color space of the image data 650, thereby generating image data (converted composite image data) 651 having the converted color space. The image data 651 is of an output image (processed image).

Additionally, although, in the preset embodiment, the image data 541, 542, 610, 620, 640 and 650 have also the same color space as the color space converted by the color converting unit 111 (converted color space), the same reference numerals as that of the fourth embodiment are respectively given.

<Flow of Image Processing>

Figure 13:
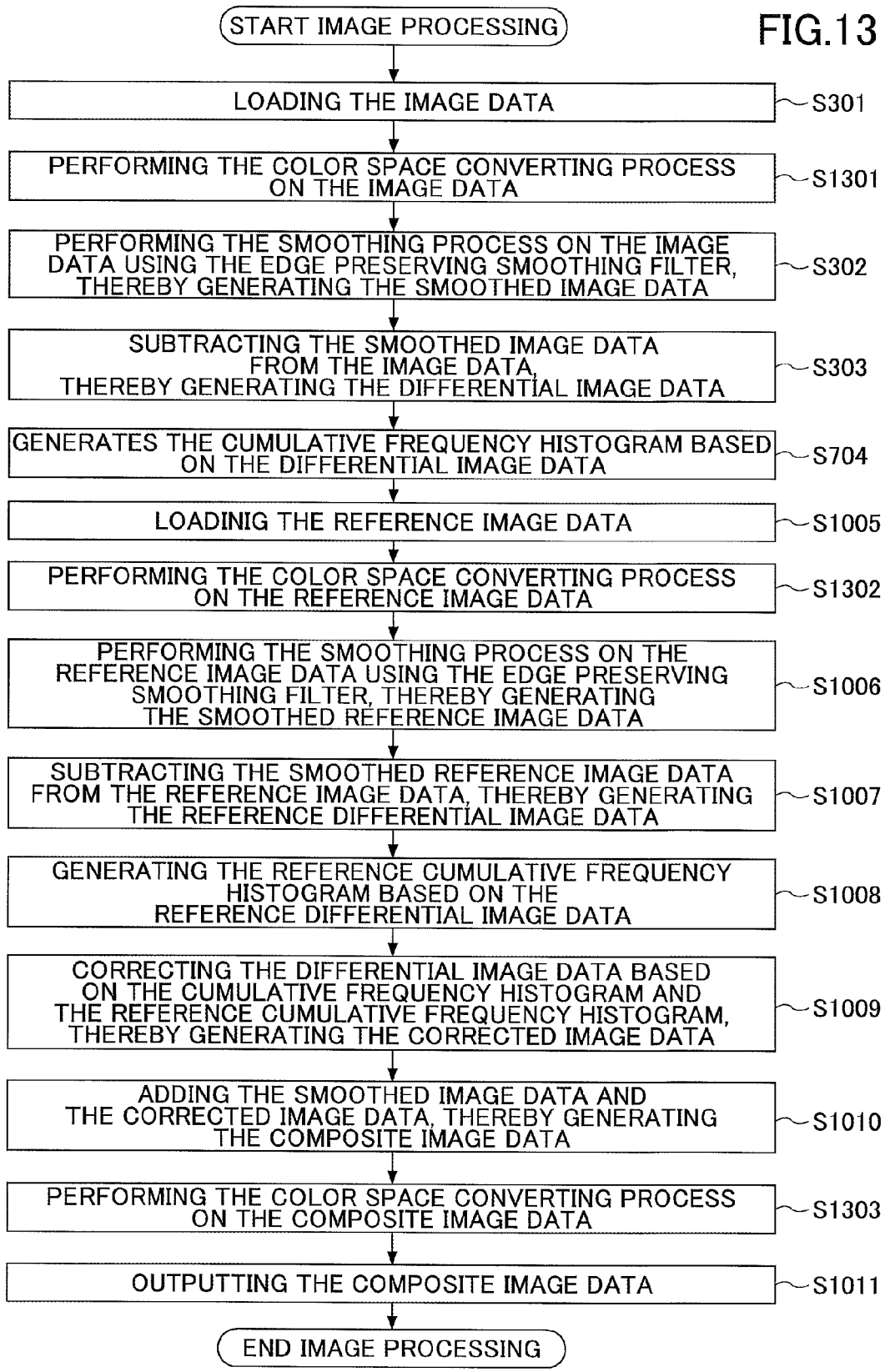
FIG. 13 is a flowchart illustrating the image processing of the image processing device of the fifth embodiment.

In the following, a flow of the image processing of the present embodiment performed by the image processing device 500 will be described. FIG. 13 is a flowchart illustrating the image processing of the image processing device of the fifth embodiment. Additionally, the difference of the image processing performed by the image processing devices 500 between the present embodiment and the fourth embodiment (FIG. 10) is steps S1301-S1303. Therefore, in the following, steps S1301-S1303 are described.

In step S1301, the color converting unit 1111 performs a color space converting process on the loaded image data (original image data) 520, thereby generating the image data (converted image data) 521. For example, RGB color space is exemplified as the color space of the image data 520, while HSV color space, Lab color space, etc., is exemplified as the color space of the image data 521. In a case where the color space converting process is separately performed on respective color components of the image data, preferably, color spaces are selected so that correlation between axes of the color spaces becomes low. Additionally, in step S302, the image smoothing unit 511 receives the image data (converted image data) 521 whose color space has been converted by the color converting unit 1111 in step S1301.

In step S1302, similarly to step S1301, the color converting unit 1111 performs color space converting processing on the loaded image data (reference image data) 540, thereby generating the image data (converted reference image data) 543. Additionally, in step S1006, the image smoothing unit 511 receives the image data (converted reference image data) 543 whose color space has been converted by the color converting unit 1111 in step S1302.

In step S1303, the color converting unit 1111 performs color space converting processing on the image data (composite image data) 650, thereby generating the image data (converted composite image data) 651. Additionally, in step S1011, the image data (converted composite image data) 651 is output.

In step S1303, the color converting unit 1111 converts the color space of the image data (composite image data) 650 into the original color space (i.e. the color space of the original image or the reference image). However, the color space of the image data 650 may be converted into another color space if the other color space is needed.

Also, in step S1009, correction of the image data (differential image data) 620 may be separately performed color component by color component or may be collectively performed. Additionally, the correction may be limitedly performed onto a brightness axis, in order to avoid a color shift caused by the correction of the image data (differential image data) 620. In this case, in steps S1301 and S1302, the converted color space has to be the one, such as HSV color space, Lab color space or the like, which has a brightness axis.

Further, the image data (differential image data) 620 may be composed of only a brightness component. Or, only brightness components of the image data (smoothed image data) 610 and the image data (corrected differential image data) 640 are added when the two image data sets are synthesized. Thus, the process becomes more efficient.

<Summary>

As described above, the image processing device of the present embodiment operates on the texture component after converting the color space of the original image data or the reference image data into another color space. Therefore, for example, risks of color shift, or the like can be reduced, by operating only on the brightness component.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

The present application is based on Japanese Priority Application No. 2014-044849 filed on Mar. 7, 2014, and Japanese Priority Application No. 2015-009667 filed on Jan. 21, 2015, the entire contents of which are hereby incorporated herein by reference.

What is claimed is:

1. An image processing device, comprising:
 a first generating unit configured to generate smoothed image data including an edge portion by performing a smoothing process on original image data using an edge preserving smoothing filter;
 a second generating unit configured to generate first differential image data of a differential image between an image of the original image data and an image of the smoothed image data;

a histogram generating unit configured to generate a differential histogram, which is a histogram of frequencies of difference values included in the first differential image data;

a third generating unit configured to generate second differential image data by correcting the first differential image data using a correction amount, wherein the correction amount for the first differential image data is calculated based on the differential histogram; and a synthesizing unit configured to synthesize the smoothed image data and the second differential image data.

2. The image processing device as claimed in claim 1, wherein the third generating unit calculates the correction amount for the first differential image data, based on the differential histogram and a reference differential histogram given in advance, so that the differential histogram becomes closer to the reference differential histogram, and generates the second differential image data by correcting the first differential image data using the correction amount.

3. The image processing device as claimed in claim 1, wherein the first generating unit further generates smoothed reference image data having an edge portion by performing the smoothing process on reference image data given in advance;

the second generating unit further generates reference differential image data of a differential image between an image of the reference image data and an image of the smoothed reference image data;

the histogram generating unit further generates a reference differential histogram, which is a histogram of frequencies of difference values included in the reference differential image data, the third generating unit calculates the correction amount for the first differential image data, based on the differential histogram and the reference differential histogram, so that the differential histogram becomes closer to the reference differential histogram, and generates the second differential image data by correcting the first differential image data using the correction amount.

4. The image processing device as claimed in claim 2, wherein the third generating unit further generates a cumulative frequency histogram of differential values included in the differential histogram, and a reference cumulative frequency histogram of differential values included in the reference differential histogram;

and calculates the correction amount for the first differential image data, based on the cumulative frequency histogram and the reference cumulative frequency histogram, so that the cumulative frequency histogram becomes closer to the reference cumulative frequency histogram; and generates the second differential image data by correcting the first differential image data using the correction amount.

5. The image processing device as claimed in claim 3, further comprising:

a converting unit configured to convert a color space of the image data into a certain color space; wherein the first generating unit generates the smoothed image data and the smoothed reference image data respectively having edge portions by respectively performing the smoothing process on the original image data and the reference image data whose color spaces are respectively converted by the converting unit.

6. The image processing device as claimed in claim 1, further comprising:

a converting unit configured to convert a color space of the image data into a certain color space; wherein the first generating unit generates the smoothed image data having an edge portion by performing the smoothing process using the edge preserving smoothing filter on the original image data whose color space is converted by the converting unit.

7. An image processing method of an image processing device, comprising the step of:

generating smoothed image data including an edge portion by performing a smoothing process on original image data using an edge preserving smoothing filter;

generating first differential image data of a differential image between an image of the original image data and an image of the smoothed image data;

generating a differential histogram, which is a histogram of frequencies of difference values included in the first differential image data;

generating second differential image data by correcting the first differential image data using a correction amount, wherein the correction amount for the first differential image data is calculated based on the differential histogram; and synthesizing the smoothed image data and the second differential image data.

8. A non-transitory computer-readable recording medium having stored therein a program for causing a computer to serve as an image processing device, the image processing device comprising:

a first generating unit configured to generate smoothed image data including an edge portion by performing a smoothing process on original image data using an edge preserving smoothing filter;

a second generating unit configured to generate first differential image data of a differential image between an image of the original image data and an image of the smoothed image data;

a histogram generating unit configured to generate a differential histogram, which is a histogram of frequencies of difference values included in the first differential image data;

a third generating unit configured to generate second differential image data by correcting the first differential image data using a correction amount, wherein the correction amount for the first differential image data is calculated based on the differential histogram; and a synthesizing unit configured to synthesize the smoothed image data and the second differential image data.

* * * * *